US010296441B2

(12) United States Patent
Jiao et al.

(10) Patent No.: US 10,296,441 B2
(45) Date of Patent: May 21, 2019

(54) DEBUGGING SUPPORT UNIT FOR MICROPROCESSOR

(71) Applicant: STMicroelectronics (Beijing) R&D Co. Ltd, Beijing (CN)

(72) Inventors: Xiao Kang Jiao, Beijing (CN); PengFei Zhu, Beijing (CN)

(73) Assignee: STMICROELECTRONICS (BEIJING) R&D CO. LTD, Beijing (CN)

( * ) Notice: Subject to any disclaimer, the term of this patent is extended or adjusted under 35 U.S.C. 154(b) by 101 days.

(21) Appl. No.: 15/203,659

(22) Filed: Jul. 6, 2016

(65) Prior Publication Data

US 2017/0322867 A1    Nov. 9, 2017

(30) Foreign Application Priority Data

May 4, 2016    (CN) .......................... 2016 1 0289784

(51) Int. Cl.
*G06F 11/00* (2006.01)
*G06F 11/36* (2006.01)
*G06F 11/22* (2006.01)

(52) U.S. Cl.
CPC ...... *G06F 11/3624* (2013.01); *G06F 11/2236* (2013.01); *G06F 11/36* (2013.01); *G06F 11/3636* (2013.01); *G06F 11/3648* (2013.01)

(58) Field of Classification Search
CPC ............. G06F 11/2236; G06F 11/3636; G06F 11/3648; G06F 11/3656; G06F 11/3664; G06F 11/36
See application file for complete search history.

(56) References Cited

U.S. PATENT DOCUMENTS

| | | | | |
|---|---|---|---|---|
| 5,560,036 A | * | 9/1996 | Yoshida | G06F 11/261 711/170 |
| 5,964,893 A | * | 10/1999 | Circello | G06F 11/3648 703/23 |
| 6,026,501 A | * | 2/2000 | Hohl | G06F 11/3636 714/29 |
| 6,314,530 B1 | * | 11/2001 | Mann | G06F 11/348 714/25 |
| 7,231,551 B1 | * | 6/2007 | Treue | G06F 11/3636 714/30 |
| 2007/0214389 A1 | * | 9/2007 | Severson | G06F 11/3656 714/30 |
| 2013/0007533 A1 | * | 1/2013 | Miller | G06F 11/263 714/45 |
| 2016/0062862 A1 | * | 3/2016 | Moyer | G06F 11/263 714/33 |

* cited by examiner

*Primary Examiner* — Charles Ehne

(74) *Attorney, Agent, or Firm* — Seed IP Law Group LLP

(57) ABSTRACT

A debug-enabled processing device includes a processor, a communication transceiver circuit, and a debug support unit. The debug support unit has a plurality of dedicated debug registers to facilitate debugging a software program under execution by the processor. One of the plurality of debug registers is a control register having at least four bits, which are used to enable/disable a plurality of debugging operations. Others of the debug registers include a set of index registers that may be configured to pass data to and from the processor.

19 Claims, 3 Drawing Sheets

DEBUGGING SUPPORT UNIT FOR MICROPROCESSOR

BACKGROUND

Technical Field

The present disclosure generally relates to debugging a software program. More particularly, but not exclusively, the present disclosure relates to a hardware-based debugging support unit useful for debugging the software program.

Description of the Related Art

Ever since developers have been writing software code, there has been a need to debug software. In some cases, when software does not work properly, a developer studies the software code and tries to debug the problem mentally. In many cases, particularly when the software is more than a short simple program, a mental approach to debugging software will not work.

Various tools have been created to assist developers to debug software. In some cases, the conventional debugging tools are formed entirely from software. In other cases, the conventional debugging tools are formed from a combination of hardware and software.

FIG. 1 is a conventional debugging system 10. In the system, a host computing device 12 is communicatively coupled to a target system 50 via a serial communication medium 34. The host computing device 12, which is typically a personal computer, includes a hardware module 14 and a memory module 16. The hardware module 14 includes a processor 18 along with a support logic module 20. The memory module 116 typically includes operating system software 22, application software 24, and a debug software program 26.

The host computing device 12 is generally under the control of a software practitioner, such as a developer. The developer receives information from the host computing device 12 via a display 28, and the developer provides information to the host computing device 12 via a keyboard 30 and a mouse 32. Under the direction of the software practitioner, the processor 18 executes software instructions stored in the memory module 16.

The support logic module 20 of the host computing device 12 includes circuitry such as universal asynchronous receiver/transmitter (UART) controllers, memory controllers, clocks, graphics controllers, and the like. At the direction of the software practitioner, the debug software program 26 communicates with the target system to send control information and receive data or status information. In the conventional debugging system 10 of FIG. 1, control information and data is passed through a UART of the support logic module 20 to the target system 50 over a serial communication medium 34 (i.e., a serial data cable). In addition, data and status information is passed from the target system 50 over the serial communication medium 34 to the host computing device 12.

The target system 50 of FIG. 1 includes a processor 52, a support logic module 54, a memory module 56, and a conventional debugging support unit (DSU) 58. Support logic module 54 of the target system 50 is along the lines of the support logic module 20 of the host computing device 12. In addition to communication controllers, memory controllers, clocks, graphics controllers, and the like, the support logic module 54 may also include other circuits and structures to support the functionality of the target system 50.

Resident in the memory module 56 of the target system 50 is a program 60. The program 60 includes software instructions executable by the processor 52 to carry out the functions of the target system 50. A stub 62 is optionally located within the set of software instructions of the program 60. In some cases, one or more stubs 62, which are described in more detail below, are placed in the program 60.

The DSU 58 includes an optional processor 64, optional DSU software 66, and an optional logic module 68. The DSU 58 directs debugging operations on-board the target system 50. In cases where the DSU 58 includes the optional processor 64, the DSU 58 will also include the optional DSU software 66, which includes software instructions executable by the optional processor 64. The optional logic module 68 of the DSU 58 may include registers, comparators, clocks, input/output circuits, and the like, to facilitate debugging operations. In a conventional implementation of target system 50, operations of the DSU 58 are directed by the software practitioner. The software practitioner uses the host computing device 12 to enter debugging commands, which are interpreted by the debug software program 26 and communicated via the serial communication medium 34 to the target system 50.

A conventional debugging method used by the software practitioner is referred to as the "stub" method. The stub method is implemented substantially in software. In the stub method, a software practitioner identifies an area in the program 60 where a suspected bug may be found. Then, in this area, a selected instruction in the program 60 is replaced with an illegal instruction. The illegal instruction is one that is not understood by the processor 52, so that when the processor 52 tries to execute the illegal instruction, which is the stub 62, the processor 52 will instead assert an illegal-instruction trap. Rather than traditional illegal-instruction trap handler, the incidence of the illegal-instruction trap causes the DSU 58 to perform debugging operations. That is, the DSU 58 allows the software practitioner to "take over" control of the target system 50 at the point in the program 60 where the software practitioner believes there is a bug.

For example, if the target system 50 is failing to illuminate a certain light emitting diode (LED) when a particular condition is encountered, the software practitioner may identify the portion of program 60 where software instructions interrogate the particular condition. The address of one of those software instructions is selected by the software practitioner, and the original software instruction is replaced with the illegal software instruction. The software practitioner performs this replacement by entering commands at the host computing device 12, which direct the DSU 58 to perform the replacement.

After the stub 62 is placed in the memory address space of the program 60, the processor 52 is permitted to execute the instructions of program 60 as normal. When the illegal instruction (i.e., the stub 62) is encountered, the processor 52 will suspend its normal instruction flow, save a current state of the processor, and load a program counter (PC) register with the address of a predetermined trap handler. The predetermined trap handler includes debugging software instructions. For example, the first instructions in the predetermined trap handler may save the contents of one or more registers of the processor 52 in a temporary memory space, save the contents of other portions of memory in the temporary memory space, or take other actions to capture the state of the target system 50 at the moment the illegal instruction (i.e., the stub) was encountered. Within the predetermined trap handler, the software practitioner can also interactively read registers of processor 52, read and write data or software instructions in memory module 56, or perform other actions to try and determine where the bug in the program 60 exists.

When the software practitioner has determined that sufficient debugging has been performed, the software practitioner will direct the DSU 58 to replace the stub 62 with the original software instruction of program 60 that was present before the stub 62 was loaded, and the registers and memory areas previously saved in the temporary storage space will be restored. Next, the software practitioner will direct the processor 52 to return from the predetermined trap handler. The processor 52 will restore the original state of the processor, and reload the PC register with the address of the now replaced software instruction. In this way, execution of the program 60 will resume where it was previously interrupted and with a context and state as it existed prior to the trap.

Returning to the previous example of failing to illuminate an LED, the software practitioner will force the DSU 58 to place one or more stubs 62 in strategic areas of program 60. As the processor 52 executes the software instructions of program 60 and encounters each stub 62, the software practitioner has an opportunity to identify why the expected particular condition is not realized, why the expected particular condition is not properly interrogated, why the LED is not illuminating, or some other bug.

In the stub method, a software practitioner strategically places one or more stubs 62 in areas of program 60 where debugging is desired. At each point where a stub 62 is encountered, an illegal-instruction trap is triggered, and the software practitioner has an opportunity to interrogate or otherwise control the target system 50. As bugs are discovered, the software instructions of program 60 can be updated or otherwise rewritten to remove the bugs.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

The use of a conventional debugging support unit and methodologies to allow a software practitioner to debug a program has led to the discovery of significant drawbacks with the conventional approach. Conventional debugging has heretofore been a limited and difficult to implement process. The use of the improved debugging support unit (DSU) described herein provides a software practitioner with a simpler implementation, which may be based entirely on hardware, that also includes functionality not available in the conventional system.

A debug-enabled processing device may be summarized as including: a processor; a communication transceiver circuit; and a debug support unit, the debug support unit having a plurality of dedicated debug registers that facilitate debugging a software program under execution by the processor, the plurality of debug registers including: a control register having at least four bits, the at least four bits including control bits to enable/disable a plurality of debugging operations; and a set of index registers, the set of index registers configurable to pass data to and from the processor.

The control register may include: a first one of the at least four bits arranged to enable a debug mode when the first one of the at least four bits takes a first value and further arranged to disable the debug mode when the first one of the at least four bits takes a second value; a second one of the at least four bits arranged to provide status regarding a pipeline flushing operation; a third one of the at least four bits arranged to enable and disable a trap handling operation; and a fourth one of the at least four bits arranged to control the trap handling operation. The set of index registers may include: a write enable register to control whether a data transfer operation is a read operation or a write operation; an address register to store a value representing an architecture state of the processor; and a data register to store data being transferred.

The debug-enabled processing device may further include an integrated circuit package, the integrated circuit package having the processor, the communication transceiver circuit, and the debug support unit formed therein.

The processor may be a reduced instruction set computing (RISC) device. The processor may include a multi-stage execution pipeline, the multi-stage execution pipeline including at least a fetch stage, a decode stage, an execution stage, and a write back stage.

The debug-enabled processing device may include a memory, the memory having the software program stored therein.

The memory may be a non-transitory read only memory (ROM). The debug support unit may be an electronic circuit having an absence of any software. The debug support unit may include a debug control circuit, the debug control circuit arranged to pass signals between the processor and at least one register of the debug support unit.

A debugging method performed via a target device, the target device having a processor, a communication transceiver circuit, and a debug support unit, the debug support unit having a plurality of dedicated debug registers, may be summarized as including: writing a first value to a control register of the dedicated debug registers to enable a debug mode of the target device; writing a second value to the control register of the dedicated debug registers to suspend an execution of instructions of a program being debugged; polling the control register of the dedicated debug registers for a signal indicating that the processor has flushed any instructions that were in an execution pipeline of the processor before suspending execution of the instructions of the program being debugged; passing data to or from registers of the processor via a set of index registers of the dedicated debug registers; and writing a second value to the control register of the dedicated debug registers to disable the debug mode of the target device.

The debugging method may further include: writing a third value to the control register of the dedicated debug registers to enable a single-step mode of the target device; writing an address of a selected instruction of the program being debugged; polling the control register of the dedicated debug registers for a signal indicating that the processor trapped on the address of the selected instruction; passing second data to or from registers of the processor via the set of index registers of the dedicated debug registers; writing a next address of the program being debugged as the address of the selected instruction; writing a fourth value to the control register of the dedicated debug registers to restart program execution; and polling the control register of the dedicated debug registers for the signal indicating that the processor trapped on the address of the selected instruction.

Passing the data to or from the registers of the processor may include: communicatively coupling the communication transceiver circuit to a host computing device external to the target device; and communicating the data via the communication transceiver circuit and the host computing device according to a Joint Test Action Group (JTAG) protocol.

The debugging method may include receiving a plurality of debugging instructions from the host computing device, the plurality of debugging instructions drawn from a set of debugging instructions including a stop instruction, a run instruction, a single-step instruction, a data read instruction, and a data write instruction.

The execution pipeline may include at least a fetch stage, a decode stage, and an execution stage, the method including: accepting a first debugging instruction from a host computing device, the first debugging instruction including an instruction to be executed by the processor; passing the first debugging instruction from a dedicated debug register of the debug support unit to at least one stage of the execution pipeline of the processor.

An embedded processing system may be summarized as including: a processor means for executing software instructions of a target program; a transceiver means for communicating first data between the embedded processing system and an external host computing device; and a debug support unit means for directing debug operations on the target program, the debug support means including: a control register means for enabling and disabling a plurality of debugging operations; and an index register means for passing second data to and from the processor.

The control register means may include: a first means for enabling a debug mode and for disabling the debug mode; a second means for indicating a status of a pipeline flushing operation; a third means for enabling a trap handling operation and for disabling the trap handling operation; and a fourth means for controlling the trap handling operation.

The index register means may include: a write enable means for directing read operations and write operations; an address means for storing an address to be accessed; and a data storage means to store data being transferred.

The embedded processing system may include a memory means, the memory means storing the target program.

The embedded processing system may include software to direct operations of the debug support unit means.

This Brief Summary has been provided to introduce certain concepts in a simplified form that are further described in detail below in the Detailed Description. Except where otherwise expressly stated, the Brief Summary is not intended to identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. Sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Figure 1:
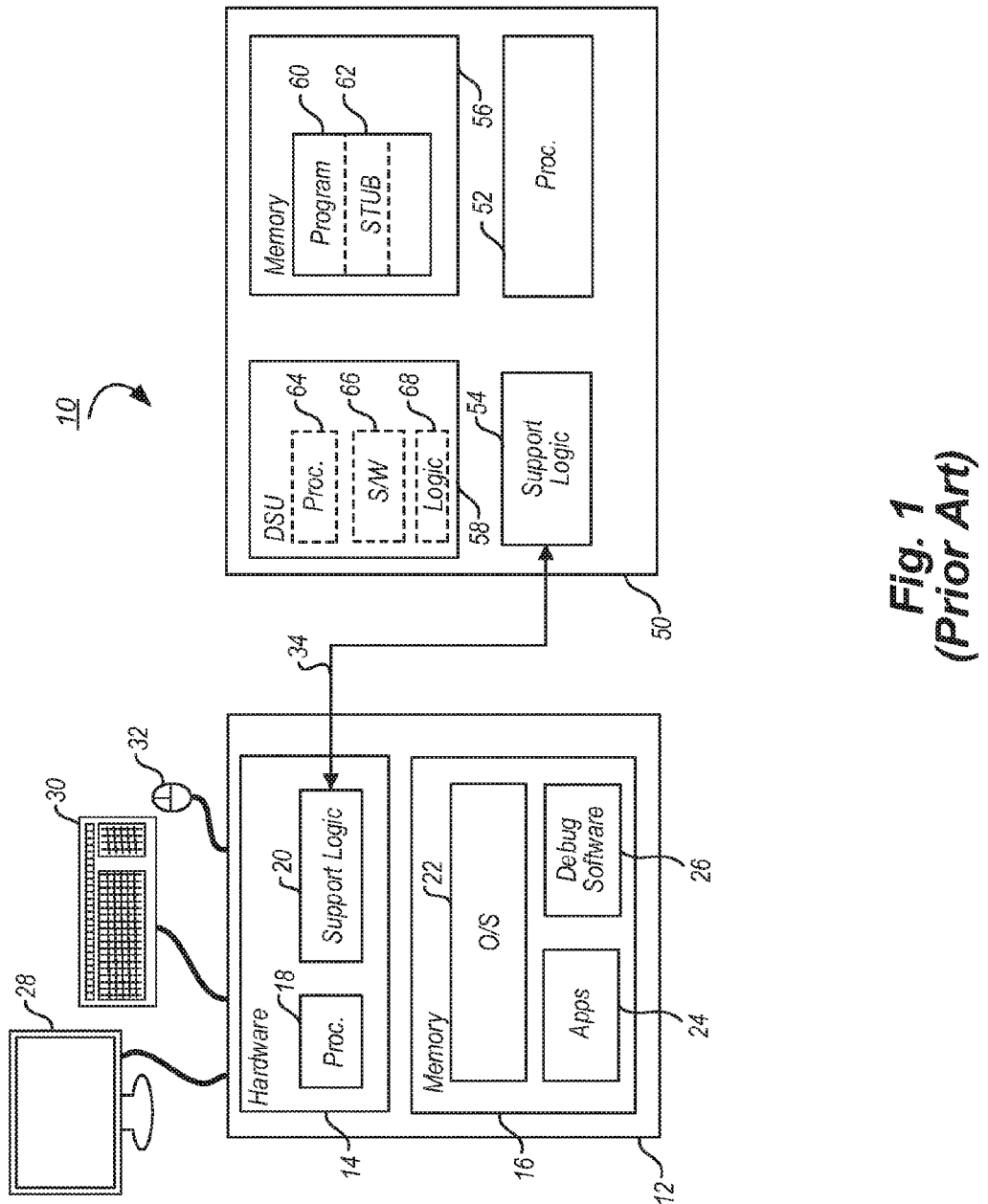
FIG. 1 is a conventional debugging system.

As time goes on, modern microprocessors and application programs continue to become more complex and application program design cycles continue to become shorter. To address these new demands, a powerful and efficient debugging system becomes more important to a software practitioner, such as an application designer. The present inventors have recognized certain weaknesses and inefficiencies found in known debugging tools such as the conventional debugging system 10 of FIG. 1. The shortcomings of the known debugging tools are addressed and improved by one or more inventive embodiments of an improved debugging support unit (DSU), which is described in detail in the present disclosure. The improved DSU has a powerful new structure different from the conventional DSU 58 of FIG. 1, which can simplify debugging flow and reduce the influence of the debugging system on the application program.

When the present inventors studied the conventional debugging system 10, it was recognized that although the stub method is predominantly implemented in software, the system requires certain hardware resources of the processor 52. For example, in the conventional debugging system 10, an interrupt resource, a UART interface, and certain memory space of the processor 52 must be dedicated to the debugger.

In the conventional debugging system 10, the dedicated interrupt resource is used to initialize debug mode. When the stub method is implemented, a new debug point (i.e., stub 62) can only be set after the processor 52 is already in the debug mode. Accordingly, the very first entry into the debugging mode must be triggered in a different way. In many circumstances, the very first entry into the debugging mode is carried out by triggering a dedicated interrupt source and using the associated interrupt handler to initialize the debugging method.

Also in the conventional debugging system 10, a communications interface, such as a dedicated UART interface, is allocated to the debugger. The dedicated UART interface is used to receive commands from the host computing device 12 and to transmit information from the target system 50 back to the host computing device 12.

Memory space in the conventional debugging system 10 must also be dedicated to the debugger. All of the functions of the stub method are implemented in software. The additional software instructions are stored in a memory module 56 of the target system 50.

The dedication of certain hardware resources of the target system 50 to the debugger creates design inefficiency and places undesirable limitations on the target system 50. For example, dedicating an interrupt resource to the debugger means that the dedicated interrupt resource is reserved and cannot be used by the software practitioner for another purpose. Along these same lines, dedicating a UART resource to the debugging system means that, at least during a debugging session, the UART resource cannot be used by the target system 50. Furthermore, since the software practitioner cannot predict when debugging will be necessary, the UART resource must typically remain unallocated and not used in the normal operation of the target system 50.

As another example, the stub method places debugging software instructions in memory. In cases where the DSU 58 does not store the optional DSU software 66 within the DSU 58, the debugging software instructions must instead be stored in the memory module 56. In these cases, the memory that is used for debugging software instructions is not available to implement the program 60. In cases where a target system has a very limited microprocessor, the loss of memory space for the target program 60 can become very important. Another limitation of the stub method is the requirement to replace a normal instruction of the program 60 with a stub 62. In order to implement the replacement, the memory module 56 must include a dynamically rewritable memory such as random access memory (RAM) where the program 60 is stored.

The conventional debugging system 10 is also very complex. In the stub method, many steps are required to implement a debug operation. For example, a normal instruction must be replaced with an illegal one, context must be saved, the debugging operation must access particular states of the processor 52, and the original normal instruction that was replaced must then be restored. When exiting the stub method, the original state (e.g., context) information of the processor 52 must also be restored. This complex implementation of the stub method is very inefficient.

Figure 2:
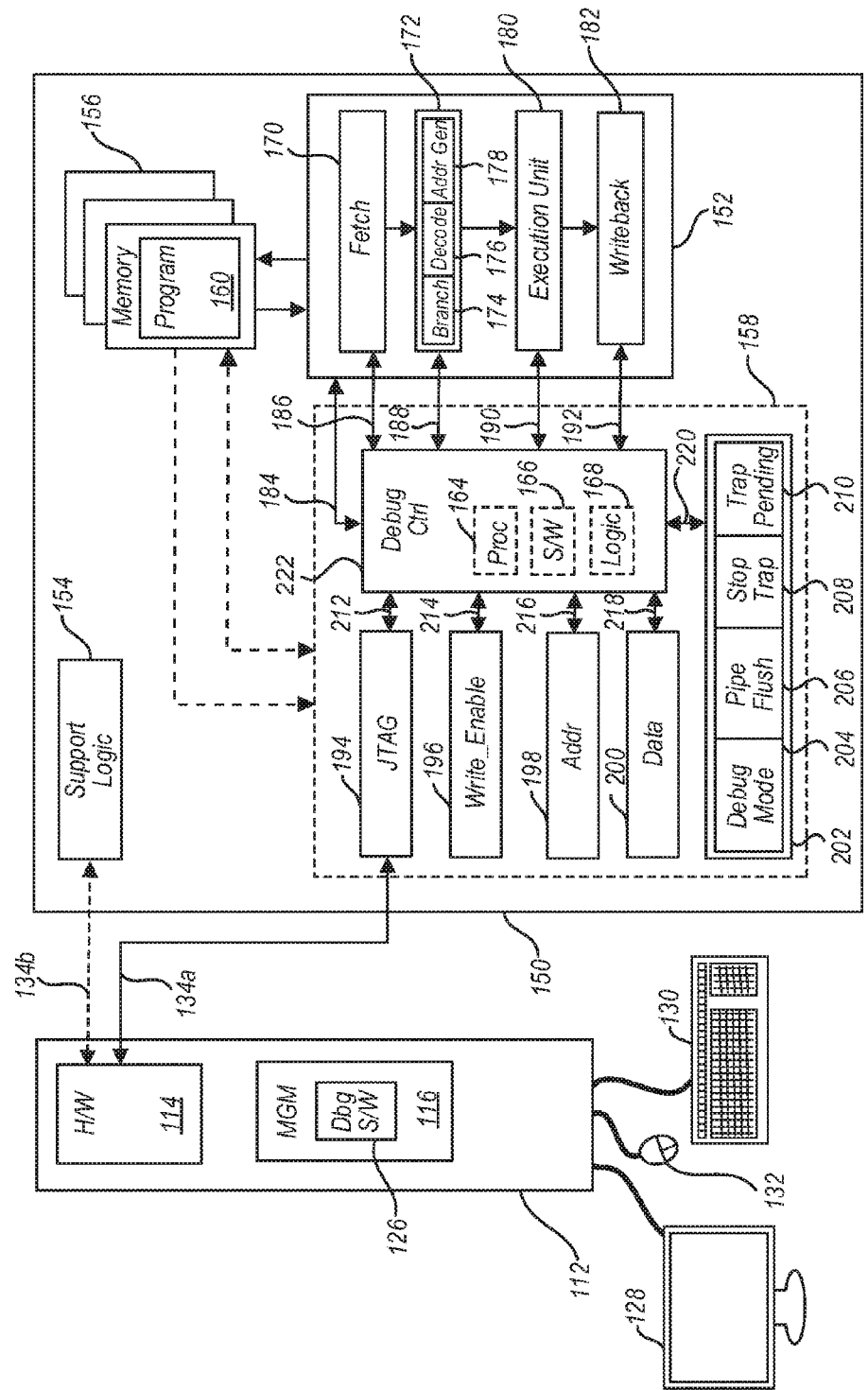
FIG. 2 is a debugging system having an improved debugging support unit embodiment.

FIG. 2 is an improved debugging system 100 having an improved debugging support unit embodiment 158. The improved debugging system 100 has at least two computing devices including a host and a target. The host is a computing device 112 such as a personal computer, laptop computer, tablet, smart phone, or some other computing device; the target is a target system 150, which may be an embedded computing device directed toward a retail device, a manufacturing device, and an industrial device, a military device, a consumer device, or nearly any other kind of device that includes a processor-based system. In some cases, the target system 150 illustrated in FIG. 2 may represent the entire device, which has other features that are not shown for simplicity. For example, the target system 150 illustrated in FIG. 2 may be an industrial machine, a building system such as an air conditioning or heating unit, an automobile, or some other entire system. In other embodiments, the target system 150 illustrated in FIG. 2 may be an integrated circuit (IC) having one or more dies formed in the IC package. In still other embodiments, the target system 150 illustrated in FIG. 2 may be a set of structures formed on a single die.

The host computing device 112 includes a hardware module 114 and a memory module 116. The host computing device 112 may receive input and provide output through one or more human interface devices (HID) such as a presentation device 128 (e.g., a display, LED's, a vibrator or other tactile feedback device), a first input device 130 (e.g., a keyboard, a keypad, or a microphone), and a second input device 132 (e.g., a mouse, a trackpad, a touchscreen, a smart pen, or the like).

The target system 150 includes a processor 152, support logic 154, a memory module 156, and an improved debugging support unit (DSU) 158. In some cases, the memory module 156 is entirely internal to the target system 150 as shown in FIG. 2, entirely external to the target system 150, or partially internal and partially external to the target system 150.

In some cases, the processor 152 is a reduced instruction set computer (RISC) device having a core formed according to an ADVANCED RISC MACHINES (ARM) design. As illustrated in FIG. 2, the processor 152 includes a multi-stage instruction pipeline having a plurality of stages. A first pipeline stage 170 is a fetch stage, which is responsible for retrieving software instructions from the memory module 156. A second pipeline stage 172 is a decode stage. The decode stage is responsible for parsing the software instruction fetched in the first pipeline stage 170. The decode stage will include decode logic 176 to identify, group, or otherwise distinguish bites, nibbles, pairs, other bit groupings, or individual bits of a software instruction. The decode stage may also include branch logic 174 and address generation logic 178. Branch logic 174 performs prospective actions associated with jump or branch software instructions, and address generation logic 178 processes portions of a software instruction that retrieve or store data in memory module 156. A third pipeline stage 180 is an execution unit stage. The execution unit stage may include one or more arithmetic logic unit's (ALU's), multiplication units, comparator units, or other execution logic. A fourth pipeline stage 182 is a write back unit responsible for storing (i.e., writing back) data that was generated in the execution unit in memory module 156.

Other architectures of the processor 152 are also contemplated. Other architectures may be RISC architectures or processors configured to operate in different ways. In some cases, as contemplated by the inventors for example, the processor 152 may be arranged within an execution pipeline that has five states: a pre-fetch state, a fetch state, a decode state, a memory accessing state, and an execution state.

The improved DSU 158 includes a debug controller 222, a debug control register 202, a set of index registers (i.e., write_enable register 196, an address register 198, and a data register 200), and a test port 194. The debug control register 202 may include discrete portions (e.g., single bits or groupings of two or more bits) such as a debug mode enable/disable portion 204, a pipeline flush status portion 206, an execution stop control portion 208, a trap handler control/status portion 210, and other portions.

Core control signals 184 may be passed between the improved DSU 158 and the processor 152. In some embodiments, all of the core control signals 184 may be passed on a single conduit. In other embodiments certain ones of the core control signals 184 may be passed between the debug controller 222 and various stages of the execution pipeline of processor 152. For example, optional fetch stage control signals 186 pass between the debug controller 222 and the first pipeline stage 170, optional decode stage control signals 188 pass between the debug controller 222 and the second pipeline stage 172, optional execution unit control signals 190 pass between the debug controller 222 and the third pipeline stage 180, optional write back stage control signals 192 pass between the debug controller 222 and the fourth pipeline stage 182. These and other control signals may pass between the debug controller 222 and one or more of the stages illustrated in processor 152. In some cases, one or more of such signals are unidirectional; in other cases, one or more of such signals are bidirectional or multidirectional.

Other optional signals may also pass between structures of the improved DSU 158. For example, debug control register signals a pass between the debug controller 222 and the debug control register 202. Data register control signals 218, address register control signals 216, and write_enable register control signals 214 may optionally pass between the debug controller 222 and the respective index registers (i.e., data register 200, address register 198, and write_enable register 196).

The test port 194 includes a communication transceiver circuit. In some embodiments, the test port 194 conforms to a standardized protocol, which may include a hardware protocol, a software protocol, or a hardware and software protocol. For example, the test port 194 may conform to a protocol of the IEEE such as the Joint Test Access Group (JTAG). Control and data signals 212 are passed between the test port 194 and the debug controller 222. In addition, the test port 194 may be coupled via a first communication medium 134a to the host computing device 112. The first communication medium 134a may be a serial communication medium (e.g., RS-232, USB, or the like) or a multipath communication medium (e.g., parallel). The first communication medium 134a may be wired or wireless (e.g., BLUETOOTH, Infrared (IR), cellular, or the like). Accordingly, in some cases, the host computing device 112 and the target system 150 may be remote from each other, but in relatively close proximity to each other. In other cases, the host computing device 112 and the target system 150 may be separated from each other by a great distance (e.g., in different rooms, different cities, and the like). As used herein, the test port 194 may otherwise be referred to as a communication transceiver circuit, a test port transceiver circuit, a communication test port, or the like.

The support logic 154 of the target system 150 may include any type of logic useful to the functioning of the target system 150. For example, the support logic 154 may include general-purpose input/output (GPIO), analog-to-digital (A2D) and digital-to-analog (D2A) converters, accelerometers or other micro-electromechanical systems (MEMS), transceivers, clocks, counters, anti-tamper circuits, power supplies, encryption/decryption or other security logic, memory controllers to pass data to and from memory that is internal or external to the target system 150, and the like. In some cases the target system 150 is optionally coupled via the support logic 154 to the host computing device 112 via a second communication medium 134b. The second communication medium 134b may be along the lines of the first communication medium (i.e., serial, multipath, wired, wireless, and the like).

In some embodiments, the entire improved DSU 158 is implemented exclusively in hardware. That is, all of the structures of the improved DSU 158 are comprised of electronic circuits having an absence of any software. In other embodiments, certain portions of the improved DSU 158 are implemented in software. In these cases, the debug controller 222 may include an optional processor 164 and an optional memory for storing improved DSU software 166. In both cases (i.e., where the improved DSU 158 is implemented exclusively in hardware and where the improved DSU 158 has portions implemented in software), an optional logic module 168 may be included. The optional logic module 168 may include clock logic, counting logic, timer logic, comparator logic, math logic, or any other logic.

The debug controller 222 may be referred to herein as a debug control circuit, a debug circuit, or some other like term. The debug controller 222 may be implemented as a state machine using, for example, combinatorial logic. Among other things, the debug controller 222 is arranged to pass signals between the processor 152 and at least one register of the improved DSU 158.

A debug software program 126 may be stored in the memory module 116. Via the debug software program 126 running on the host computing device 112, a software practitioner can send debugging commands to the target system 150 and receive information from the target system 150. The debugging commands permit the software practitioner to perform certain debugging functions such as stopping the processor 152, reading or modifying a state of the processor 152, reading or modifying information in the memory module 156, and resuming the processor 152 to a running state.

Generally speaking, the software practitioner implements a debugging operation having three components. A first component permits the software practitioner to enter a debugging mode, which stops the normal flow of the target device program software 160. A second component permits the software practitioner to access one or more states of the processor 152. For example, the software practitioner can read or modify general-purpose registers, control registers, a program counter register, or the like. A third component permits the software practitioner to exit the debugging mode. When the debugging mode is exited, in some cases, some or all of the program state, context, and memory data is restored so that the target device program software 160 will resume at the same programmatic circumstance as when the debugging mode was entered.

Compared with the conventional stub method executed on a conventional debugging system 10 (FIG. 1), the improved debugging system 100 provides many advantages. For example, the improved debugging system 100 is a much simpler implementation. For example, some embodiments of the improved debugging system 100 are formed totally in hardware. In these embodiments, debugging can be performed by simply configuring a small number of hardware registers (e.g., four registers including a control register and three index registers).

The hardware registers of the improved debugging system 100 are formed in close proximity to the processor 152. In some cases, the registers are formed within the same integrated circuit package as the processor 152, on the same die as the processor 152, or in some other area. In cases where the processor 152 is a microprocessor, for example, the small number of registers may be implemented within the microprocessor. In these cases, the entire improved DSU 158 may be implemented within the microprocessor. Alternatively, only some portions of the improved DSU 158, such as the small number of hardware registers, are implemented in the microprocessor.

As used herein, the hardware registers of the improved debugging system 100 may also be interchangeably referred to as a plurality of dedicated debug registers, debug registers, dedicated registers of the improved DSU 158, or the like. The hardware registers are used to facilitate debugging a software program under execution by the processor 152.

Using the hardware registers, the software practitioner does not need to direct the replacement of a normal program instruction with an illegal instruction (e.g., stub 62). Instead, certain register values can be loaded, and since the hardware registers are integrated with various portions of the processor 152, such as the execution pipeline, the software practitioner is able to direct execution of the target device program software 160. The software practitioner can stop execution, restart execution, retrieve data values from memory or registers, store data values into memory or registers, or perform other actions. In addition, the software practitioner does not need to direct operations to save the context of the processor 152 when execution is stopped, or direct operations to recover context of the processor 152 when execution is restarted, as is necessary in the stub method.

Another advantage of the improved debugging system 100 is an absence of dedicated resources. The improved DSU 158 includes a small number of hardware registers that are used to implement the debugging operations. The software practitioner is free to use other hardware resources of the target system 150 to perform the desired operations of the target system 150. For example, an otherwise available communications port of the target system 150 does not need to be dedicated for debugging, which is different from the conventional debugging system 10. Additional advantages are associated with memory. In the improved debugging system 100, memory associated with the target system 150 may be used entirely to implement and support the target device program software 160, and no extra memory is necessary to support the debugging operations. In addition, since the stub 62 is not necessary, the target system 150 may store the target device program software 160 in any type of memory including volatile memory such as RAM and non-volatile memory such as read-only memory (ROM).

The hardware registers of the improved debugging system 100 may be grouped into two sets: index registers and control registers. In the non-limiting embodiment of FIG. 2, three index registers are formed and one control register is formed. More or fewer index registers are formed in other embodiments. More or fewer control registers are formed in other embodiments.

The three index registers of FIG. 2 include a first index register, i.e., a write_enable register 196; a second index register, i.e., an address register 198; and a third index register i.e., data register 200. In the present embodiment, the write_enable register 196 is one bit wide, the address register 198 is eight bits wide, and the data register is 32 bits wide. Other configurations have also been contemplated by the inventor. For example, in a processor 152 having a 16-bit wide or a 32-bit wide address bus, the address register 198 may be formed having a corresponding width. Along these lines, in a processor 152 having an eight bit wide or 16-bit wide data bus, the data register 200 may be formed having a corresponding width.

The debug control register 202 of FIG. 2 may be considered as a single register of four bits, four registers of one bit each, or the set of control registers may have some other configuration of more or fewer registers, more or fewer bits, or the like. In the debug control register 202, a first control portion is a debug mode enable/disable portion 204, which is one bit wide and arranged to be written or read; a second control portion is a pipeline flush status portion 206, which is one bit wide and arranged to be read only; a third control portion is an execution stop control portion 208, which is one bit wide and arranged to be written or read; and a fourth control portion is a trap handler control/status portion 210, which is one bit wide and arranged to be written or read.

The index registers are generally used to indicate which states of the processor 152 are being debugged. The control register is generally used to enable and disable debugging, interact with an execution pipeline of the processor 152, and perform other control operations. Both the index register set and the control register set will be described in more detail below. Exemplary and non-limiting embodiments of the index register set and control register set are shown in Table 1 and Table 2.

TABLE 1

Description of Index Registers

| Register | Bit Width | Reset Value | Description |
|---|---|---|---|
| write_en | 1 | 0 | 1 = write<br>0 = read |
| addr | 8 | X | The state to be debugged |
| data | 32 | X | Data to be transferred |

TABLE 2

Description of Control Registers

| Register | Bit Width | Access Right | Reset Value | Description |
|---|---|---|---|---|
| DebugMode | 1 | R/W | 0 | 1 = written to stop processor<br>0 = written to restart processor |
| PipeFlushing | 1 | RO | 1 | 1 = pipeline is flushing<br>0 = pipeline flush is complete |
| StopTrap | 1 | R/W | 0 | 1 = stop processor on any trap<br>0 = disable stopping on a trap |
| TrapPending | 1 | R/W | 0 | Rd 1 = proc. pending on trap<br>Rd 0 = proc. not pending on trap<br>Wr 1 = resume proc. from pend.<br>Wr 0 = do nothing |

In some embodiments, hardware registers of the improved debugging system 100, for example, the hardware registers of Table 1 and Table 2, may be written, read, or written and read only by the improved DSU 158 at the direction of a software practitioner and via host computing device 112. For example, the software practitioner may interact with the debug software program 126 via an interface past to the presentation device 128. The interface may be a graphics user interface (GUI) presented on a display, for example. Using one or more input devices, such as the first input device 130 and the second input device 132, the software practitioner may identify data that represents one or more of the hardware registers. In this way, the software practitioner may direct certain values be written to one or more of the hardware registers, and the software practitioner may interrogate the values that are stored in one or more of the hardware registers. The software practitioner may start, stop, and restart execution of the processor 152. The software practitioner may read and write values to general purpose registers, control registers, status registers, and registers of any context of the processor 152. In addition, the software practitioner may read and write values to the memory module 156. The software practitioner may alter the operation of the target system 150 by reading or writing data associated with the support logic 154, by changing instructions of the target device program software 160, or performing any other actions associated with the target system 150. Stated differently, in some embodiments, the software practitioner has access to every bit of memory module 156, every bit of every register of processor 152, every bit of every register of the improved DSU 158, every bit of data associated with the support logic 154, and the like. In this way, the improved debugging system 100 provides a low-cost, very effective, and efficient debugging system that could not be provided by the conventional debugging system 10 of FIG. 1.

In some embodiments, the debugging directions of the software practitioner are carried out via the debug software program 126 executing on the host computing device 112. Instructions and data are bidirectionally passed via the first communication medium 134a through the test port 194. The test port 194, which may be configured entirely within the improved DSU 158, entirely outside of the improved DSU 158, or partially within and partially outside the improved DSU 158, interacts with the debug controller 222. In this way, the debug controller 222 is directed by the software practitioner to read certain ones of the hardware registers, write certain ones of the hardware registers, and read and write certain ones of the hardware registers.

In some cases, one or more of the hardware registers may be read, written, or read and written by the processor 152 at the direction of software such as the target device program software 160, which is being executed by the processor 152. For example, if the software practitioner anticipates particular challenges arising with operation of the target system 150, the software practitioner may include software instructions in the target device program software 160 that perform very specific actions. For example, at certain points during execution of the target device program software 160, the software practitioner may write software instructions that will load certain ones of the hardware registers to force a read of particular registers or memory; and the software instructions will also force an output the values stored in those registers to the host computing device 112 via a first communication medium 134a or a second communication medium 134b. Other programmatic operations to configure, operate, and otherwise make use of the debugging features of the improved DSU 158 are also contemplated.

The write_enable register 196 indicates whether the debugging operation directed by the software practitioner is a reading operation or a writing operation. When a first value (e.g., "1" as illustrated in Table 1) is written to the write_enable register 196, the hardware registers will perform a write operation. When a second value (e.g., "0" as illustrated in Table 1) is written to the write_enable register 196, the hardware registers will perform a read operation. The particular write or read operation may be directed toward a register of the processor 152, one or more addresses of the memory module 156, a memory mapped hardware device of the support logic 154, or some other accessible location.

The address register 198 indicates which state of the processor 152 is going to be debugged. In some cases, as illustrated in Table 2, for example, the address register 198 may be read only. In other cases, the address register 198 may also be read. The address register 198 may accept an address value of N bits. The N bits may represent a full address, a partial address, or a plurality of addresses. In the embodiment of Table 1, the value, N, is defined as 8 to indicate an eight bit wide address. In other embodiments, N may be 4, 16, 32, 64, or some other value. In some embodiments, N is an integer multiple of eight.

The state of the processor 152 that is going to be debugged may indicate a set of registers or other memory mapped addresses that are accessible in a particular operating mode of the processor 152. For example, if the processor 152 is arranged to operate in a supervisor mode and a non-supervisor mode, the processor 152 may have access to different registers based on the operating mode. In this way, all of the registers that are accessible by the processor 152 may be uniquely addressable based on a numerical address alone or in combination with an operation mode or some other index value. When the software practitioner directs a write operation to the address register 198, the software practitioner is providing direction to the improved DSU 158 that a uniquely identifiable register, memory address, or memory mapped address will be read or written. In some embodiments, the particular features of the improved DSU 158 permit auto-incrementing the address register 198, auto-decrementing the address register 198, or otherwise automatically adjusting the contents of the address register 198 to make writing or reading data more efficient.

In some embodiments, the data register 200 is a write only register. In other embodiments, the data register 200 is a read only register. In still other embodiments, such as the embodiment of Table 1, the data register 200 is a read/write register. When the software practitioner wishes to write data to a register, the practitioner will identify the data to be written, and the debug software program 126 will pass the data from the host computing device 112 to the improved DSU 158, which will then load the data into the data register 200. In some cases, the improved DSU 158 may read and write data directly to the memory module 156 as indicated by the dashed lines between the improved DSU 158 and the memory module 156. In these cases, or alternatively in other cases, the improved DSU 158 may direct reading and writing to the memory module 156 by inserting instructions into the processor 152 at a particular stage of the execution pipeline. Operations to read data from the memory module 156 and write data to the memory module 156 may be performed in some embodiments via electronic circuitry. In other embodiments, where the debug controller 222 includes an optional processor 164 and improved DSU software 166, reading and writing data in the memory module 156 may be performed programmatically (e.g., by writing software instructions that are decoded at the second pipeline stage 172 (i.e., decode stage) and executed by the third pipeline stage 180 (i.e., execution stage)).

Operations of the individual registers of the set of control registers may also be directed by a software practitioner via the host computing device 112 or programmatically with instructions defined in the target device program software 160 or some other software. In some embodiments, as defined in Table 2, for example, the individual registers of the set of control registers are formed as discrete portions (e.g., adjacent bits) of a single debug control register 202.

In some embodiments, the debug mode enable/disable portion 204 can only be accessed by the improved DSU 158 using, for example, the debug controller 222. In some embodiments, a software practitioner must direct the improved DSU 158 to access the debug mode enable/disable portion 204 via the host computing device 112. In other embodiments, a software instruction executed by the processor 152 may direct the improved DSU 158 to access the debug mode enable/disable portion 204. In these or other embodiments, the debug mode enable/disable portion 204 can be written at any time, including initialization (e.g., at or during a reset operation) of the target system 150. Because the improved debugging system 100 is configured with the debug mode enable/disable portion 204, no dedicated interrupt or error handler is necessary as it is in the conventional debugging system 10 of FIG. 1.

When the debug mode enable/disable portion 204 is set to a first value (e.g., "1"), the execution pipeline of the processor 152 is stalled. The pipeline stall signal may be passed, for example, as one of the debug control register signals 220, as one of the core control signals 184, and in addition or in the alternative, via some other means. When the debug mode enable/disable portion 204 is set to a second value (e.g., "0"), the execution pipeline of the processor 152 is restarted.

When the debug mode enable/disable portion 204 is set to the first value, other signals may also be created and passed as one or more debug control register signals 220 or via some other means. For example, in some embodiments, in addition to the pipeline stall signal, a pipeline clear or flush signal is also generated. The pipeline stall signal stalls a new instruction from being issued into the processor 152 from the memory module 156. In addition, in some embodiments, software instructions that are already in the execution pipeline are allowed to retire. This operation allows the processor 152 to be stopped at a known, predictable point. That is, it can be known which instruction was the last instruction to be fully completed at the time the processor 152 was stopped and the debugger was started. Flushing the execution pipeline in this way allows the software practitioner to perform debugging operations from a known starting point. That is, the processor 152 may be placed into a known state so that debugging operations are predictable and unaffected by lingering or partial instructions that were being executed at the time the debugger was started.

In some embodiments, after the execution pipeline is flushed, the pipeline stall signal and the pipeline clear signal are disabled. By disabling these two signals, the software practitioner may use the processor 152 to execute software instructions that will assist in the debugging operation. That is, the software practitioner can manually pass software instructions via the debug software program 126 from the host computing device 112 through the improved DSU 158 and into the processor 152. In some cases, complete software instructions are passed into the processor 152 at an initial stage, such as the first pipeline stage 170 (i.e., fetch stage). In other cases, portions of software instructions are passed into a different stage (e.g., second pipeline stage 172 (i.e., decode stage), third pipeline stage 180 (i.e., execution stage), fourth pipeline stage 182 (i.e., write back stage), or some other stage) of the execution pipeline of the processor 152.

The pipeline flush status portion 206 of debug control register 202 may be a read only portion with respect to the improved DSU 158 and a write only portion with respect to the processor 152. In other cases, both the improved DSU 158 and the processor 152 may read the pipeline flush status portion 206. In other cases both the improved DSU 158 and the processor 152 may write the pipeline flush status portion 206. The pipeline flush status portion 206 provides a status indication of the flushing operation of the execution pipeline after the debugging mode has been asserted (e.g., via setting the debug mode enable/disable portion 204 to the first value). While the flushing operation is ongoing, the pipeline flush status portion 206 will indicate a first value. After the flushing operation is complete, the pipeline flush status portion 206 will indicate a second value. In this way, the debug controller 222 may poll the pipeline flush status portion 206 and sit idle until the pipeline flush status portion 206 is loaded by the processor with the second value. Once the pipeline is flushed, the processor 152 is in a debugging mode and can be debugged.

The execution stop control portion 208 (i.e., the StopTrap signal of the embodiment of Table 2) is used to enable and disable a feature that can stop normal program execution at a particular address of the target device program software 160. In addition, or in the alternative, the execution stop control portion 208 may be used to implement a single step debug mode. When this feature is set, the debug controller 222 will cooperate with the processor 152 to stop program execution when a trap or other execution stop control signal is encountered or otherwise enable such feature. In some cases, the improved DSU 158 is arranged with one or more configurable or otherwise user defined execution stop control signals.

In one or more non-limiting embodiments, the execution stop control portion 208 generates instruction trap signals implemented along the lines of the pipeline stall and pipeline clear signals generated with the debug mode enable/disable portion 204. By loading first or second values into the execution stop control portion 208, the processor 152 will stop new instructions from entering the execution pipeline and the processor 152 will permit current instructions to retire from the execution pipeline when an execution stop condition is determined (e.g., a trap, a particular interrupt, a user-defined condition, or the like). In this way, each software instruction produced by the software practitioner or executed as a portion of the target device program software 160 enters the execution pipeline, causes the execution stop condition, stalls the execution pipeline, and is permitted to retire. To debug the "next" instruction, the improved DSU 158 will set the instruction break trap with the next sequential address of the target device program software 160 or another program.

The trap handler control/status portion 210 of debug control register 202 is used to control a trap handling operation. In the embodiment illustrated in Table 2, the trap handler control/status portion 210 (i.e., TrapPending) may be read or written. The trap handler control/status portion 210 may be implemented in other ways in different embodiments. When the execution pipeline is flushed, processor 152 may set the trap handler control/status portion 210 to a first value (e.g., "1") to indicate that the processor 152 is stopped in a trap handler and has entered the debugging mode. This first value can be read by the improved DSU 158 to learn that the processor 152 has entered the debugging mode. When the improved DSU 158 reads a second value (e.g., "0") in the trap handler control/status portion 210, the improved DSU 158 will know that the processor 152 has not stopped and is not in the debugging mode. In some cases, when a debugging mode is directed by the software practitioner or otherwise through the improved DSU 158, the improved DSU 158 will poll the trap handler control/status portion 210 and sit idle while the trap handler control/status portion 210 is set to the second value and begin other operations, such as single step operations, when the trap handler control/status portion 210 is set by the processor 152 to the first value.

When the improved DSU 158 is ready to begin processing a next instruction, which may be a next software instruction in the target device program software 160, or which may be another software instruction directed by the software practitioner and passed from the host computing device 112, the improved DSU 158 will write the first value into the trap handler control/status portion 210. The processor 152 will read the first value in the trap handler control/status portion 210 and resume processing. Resuming processing may be another single step, or, depending on how the software practitioner has directed other hardware registers, resuming processing may be a free running of the processor 152.

Figure 3:
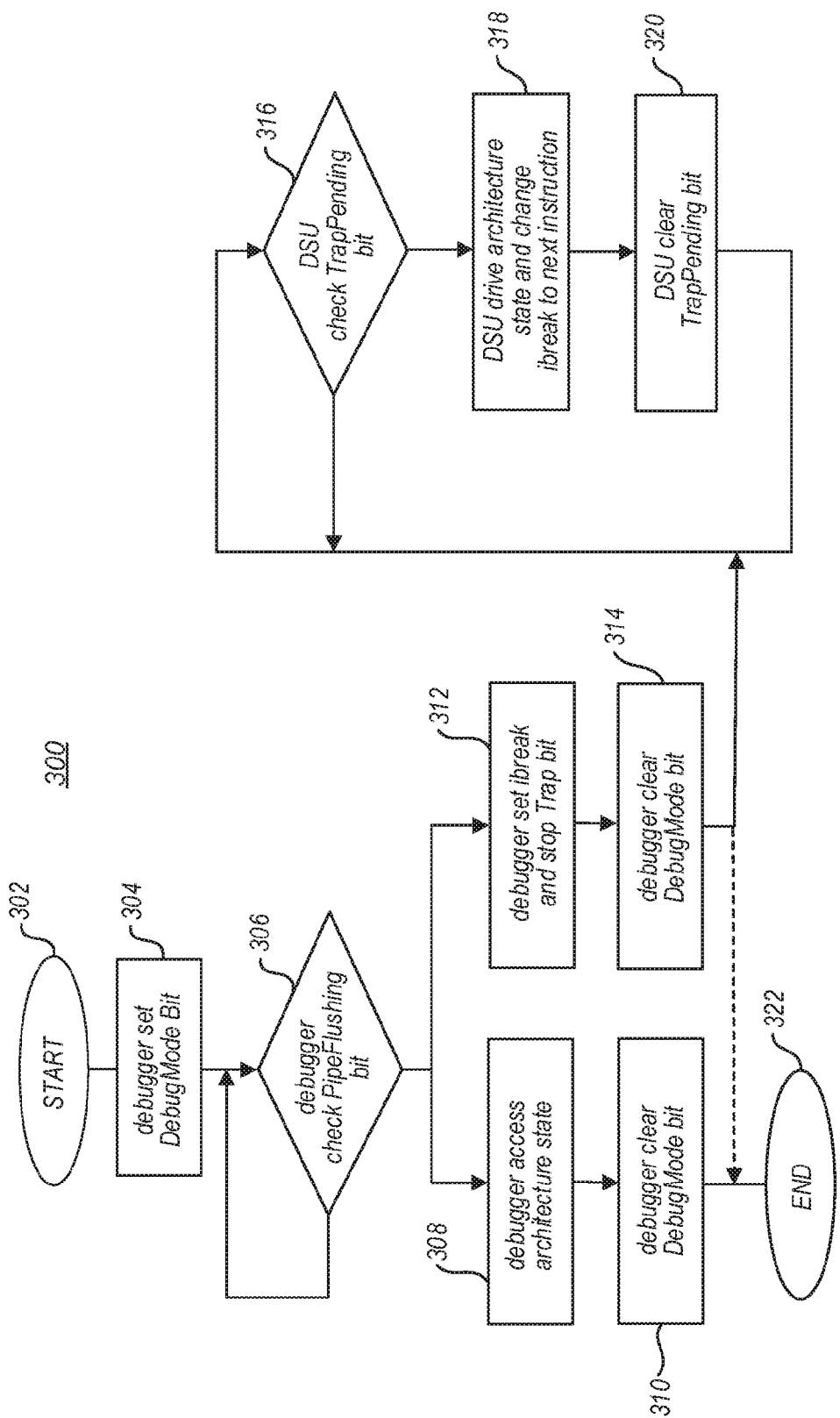
FIG. 3 is a data flow embodiment of the debugging support unit of FIG. 2.

FIG. 3 is a data flow embodiment 300 of the improved debugging support unit (DSU) 158 of FIG. 2. The improved DSU 158 supports two debug modes: a normal debugging mode and a single step debugging mode. Processing in the data flow embodiment 300 begins at 302.

At 304, a software practitioner using a host computing device 112 or a software program (e.g., target device program software 160) causes the improved DSU 158 to load a first value into a debug mode enable/disable portion 204 of a debug control register 202. At 306, the improved DSU 158 will poll or otherwise interrogate the pipeline flush status portion 206 of the debug control register 202. While the pipeline flush status portion 206 is loaded with a first value, the improved DSU 158 will remain idle or otherwise not perform particular debugging operations. This is represented by the arrow emanating from the interrogation at 306 and returning to the interrogation at 306. When the improved DSU 158 determines that the pipeline flush status portion 206 is loaded with a second value, the improved DSU 158 has entered a debugging mode. The debugging mode may be a normal debugging mode, or the debugging mode may be a single step debugging mode. In the normal debugging mode, processing falls to 308. In the single step debugging mode, processing falls to 312.

In the normal debugging mode at 308, the improved DSU 158 is allowed to access an architecture state of the processor 152. That is, the improved DSU 158 may read or write to registers of the processor 152, addresses of the memory module 156, a memory mapped addresses of the support logic module 154, or other addresses as determined by the software practitioner. If reading an architecture state, for example, the improved DSU 158 will load a second value (e.g., "0" as defined in Table 1) in the write_enable register 196, and the improved DSU 158 will load a particular address in the address register 198. Subsequently, the improved DSU 158 will retrieve a value from the data register 200, which can be passed via the test port 194 to the host computing device 112. If writing a particular state, the improved DSU 158 will load a first value (e.g., "1" as defined in Table 1) in the write_enable register 196. The improved DSU 158 will load a particular address in the address register 198 and will load a particular data value into the data register 200. The improved DSU 158 will then write the particular data value into the register, memory location, memory mapped location, or other location defined by the address in the address register 198. In some cases, the improved DSU 158 will directly read and write data from the corresponding address. In other cases, the improved DSU 158 will act cooperatively with one or more stages of the execution pipeline of the processor 152 in order to carry out the reading or the writing.

After the software practitioner or debugging program instructions perform particular acts to access the architecture state at 308 (i.e., reading/writing data at a particular address), processing falls to 310. At 310, the improved DSU 158 will set the debug mode enable/disable portion 204 to the second value. The processor 152 will resume execution of program instructions.

In the normal debugging mode, processing ends at 322. It is recognized, however, that processing in the data flow embodiment 300 may begin again at 302 at any time simply by setting the debug mode enable/disable portion 204 of the debug control register 202.

Processing in a single step debugging mode is discussed at 312. At 312, the improved DSU 158 will set the execution stop control portion 208 (i.e., StopTrap as defined in Table 2) to a first value (e.g., "1"). A particular instruction break trap, interrupt, or other user configured execution stop control will be determined to correspond with a particular instruction, which is the next instruction from where the processor 152 was stopped upon entering the debugging mode. The instruction break trap, interrupt, or user configured execution stop control, which is illustrated in FIG. 3 as "ibreak," may be an internal register, buffer, or other repository of a particular address or indicator of a next instruction.

At 314, the improved DSU 158 will set the debug mode enable/disable portion 204 of debug control register 202 to the second value (e.g., "0" as defined in Table 2). Setting the debug mode enable/disable portion 204 to the second value causes an exit from the normal debugging mode, and a restart of the processor 152. At 316, the improved DSU 158 will interrogate, poll, or otherwise check the trap handler control/status portion 210 of the debug control register 202. While the trap handler control/status portion 210 is set to a second value (e.g., "0" as defined in Table 1), processing will remain in the interrogation act of 316. When the trap handler control/status portion 210 is set by the processor 152 to a first value (e.g., "1" as defined in Table 1), processing will fall to 318.

As discussed herein, the trap handler control/status portion 210 is not set to the first value by the processor 152 until the execution pipeline is flushed (i.e., instructions in the execution pipeline are permitted to retire) and the processor 152 is ready to be debugged.

At 318, the improved DSU 158 is permitted to drive the architecture state. This act of driving the architecture state is along the lines of the processing at 308, where the improved DSU 158 is permitted to read, write, or read and write the architecture state. After such debugging by the software practitioner or debugging software is performed, the instruction break trap, interrupt, or user configured execution stop control, which is illustrated in FIG. 3 as "ibreak," is set to a next instruction. Processing falls to 320.

At 320, the trap handler control/status portion 210 is set by the improved DSU 158 to the first value. Taking this action permits the processor 152 to resume with normal instruction flow. Processing in the improved DSU 158 will return to 316. When the processor 152 fetches a next software instruction, the next software instruction will cause another trap or other execution stop control to occur, which continues the cycle at 318 as another single step.

To exit the single step debugging mode, the improved DSU 158 may set the execution stop control portion 208 to the second value and the debug mode enable/disable portion 204 to the second value. The processor 152 will restart software instruction execution, and processing in the improved DSU 158 will pass to 322.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

A processor (i.e., a processing unit), as used in the present disclosure, refers to one or more processing units individually, shared, or in a group, having one or more processing cores (e.g., execution pipelines), including central processing units (CPUs), digital signal processors (DSPs), microprocessors, micro controllers, state machines, and the like, that execute instructions. One processor in the embodiments of the present specification may be the same or different than another processor. For example, a processor in the host computing device 112 may be the same or different from the processor 152 of the target system 150. The processor 152 of the target system 150 may be the same or different from the optional processor 164 of the improved DSU 158 when such optional processor 164 is included.

In the present disclosure, memory such as the memory of memory module 156 and optional memory of the improved DSU 158, when such memory is included, may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure. The memory may be formed as one or more memories, and each memory may comprise any combination of transitory and non-transitory, volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. Some or all of the stored contents of a memory may include software instructions executable by a processing device to carry out one or more particular acts.

The data flow embodiment 300 of FIG. 3 illustrates one or more processes that may be used by embodiments of the improved DSU 158. In this regard, each described process may represent a module, segment, or portion of code, which comprises one or more executable instructions for implementing the specified logical function(s). In some implementations, the functions noted in the process may occur in a different order, may include additional functions, may occur concurrently, and/or may be omitted.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A debug-enabled processing device, comprising:
a processor, wherein the processor is a reduced instruction set computing (RISC) device;
a communication transceiver circuit; and
a debug support unit, the debug support unit having a plurality of dedicated debug registers that facilitate debugging a software program under execution by the processor, the plurality of debug registers including:
a control register having at least four bits, the at least four bits including control bits to enable/disable a plurality of debugging operations; and
a set of index registers, the set of index registers configurable to pass data to and from the processor.

2. A debug-enabled processing device according to claim 1, wherein the control register comprises:
a first one of the at least four bits arranged to enable a debug mode when the first one of the at least four bits takes a first value and further arranged to disable the debug mode when the first one of the at least four bits takes a second value;
a second one of the at least four bits arranged to provide status regarding a pipeline flushing operation;
a third one of the at least four bits arranged to enable and disable a trap handling operation; and
a fourth one of the at least four bits arranged to control the trap handling operation.

3. A debug-enabled processing device according to claim 1, wherein the set of index registers comprises:
a write enable register to control whether a data transfer operation is a read operation or a write operation;
an address register to store a value representing an architecture state of the processor; and
a data register to store data being transferred.

4. A debug-enabled processing device according to claim 1, comprising:
an integrated circuit package, the integrated circuit package having the processor, the communication transceiver circuit, and the debug support unit formed therein.

5. A debug-enabled processing device according to claim 1, wherein the processor includes a multi-stage execution pipeline, the multi-stage execution pipeline including at least a fetch stage, a decode stage, an execution stage, and a write back stage.

6. A debug-enabled processing device according to claim 1, comprising:

a memory, the memory having the software program stored therein.

7. A debug-enabled processing device according to claim 6, wherein the memory is a non-transitory read only memory (ROM).

8. A debug-enabled processing device according to claim 1, wherein the debug support unit is an electronic circuit having an absence of any software.

9. A debug-enabled processing device according to claim 1, wherein the debug support unit comprises:
a debug control circuit, the debug control circuit arranged to pass signals between the processor and at least one register of the debug support unit.

10. A debugging method performed via a target device, the target device having a processor, a communication transceiver circuit, and a debug support unit, the debug support unit having a plurality of dedicated debug registers, the method comprising:
writing a first value to a control register of the dedicated debug registers to enable a debug mode of the target device;
writing a second value to the control register of the dedicated debug registers to suspend an execution of instructions of a program being debugged;
polling the control register of the dedicated debug registers for a signal indicating that the processor has flushed any instructions that were in an execution pipeline of the processor before suspending execution of the instructions of the program being debugged;
passing data to or from registers of the processor via a set of index registers of the dedicated debug registers; and
writing a second value to the control register of the dedicated debug registers to disable the debug mode of the target device.

11. A debugging method according to claim 10, further comprising:
writing a third value to the control register of the dedicated debug registers to enable a single-step mode of the target device;
writing an address of a selected instruction of the program being debugged;
polling the control register of the dedicated debug registers for a signal indicating that the processor trapped on the address of the selected instruction;
passing second data to or from registers of the processor via the set of index registers of the dedicated debug registers;
writing a next address of the program being debugged as the address of the selected instruction;
writing a fourth value to the control register of the dedicated debug registers to restart program execution; and
polling the control register of the dedicated debug registers for the signal indicating that the processor trapped on the address of the selected instruction.

12. A debugging method according to claim 11, wherein passing the data to or from the registers of the processor comprises:
communicatively coupling the communication transceiver circuit to a host computing device external to the target device; and
communicating the data via the communication transceiver circuit and the host computing device according to a Joint Test Action Group (JTAG) protocol.

13. A debugging method according to claim 12, comprising:
receiving a plurality of debugging instructions from the host computing device, the plurality of debugging instructions drawn from a set of debugging instructions including a stop instruction, a run instruction, a single-step instruction, a data read instruction, and a data write instruction.

14. A debugging method according to claim 10, wherein the execution pipeline includes at least a fetch stage, a decode stage, and an execution stage, the method comprising:
accepting a first debugging instruction from a host computing device, the first debugging instruction including an instruction to be executed by the processor;
passing the first debugging instruction from a dedicated debug register of the debug support unit to at least one stage of the execution pipeline of the processor.

15. An embedded processing system, comprising:
a processor means for executing software instructions of a target program, wherein the processor means has a reduced instruction set computing (RISC) architecture;
a transceiver means for communicating first data between the embedded processing system and an external host computing device; and
a debug support unit means for directing debug operations on the target program, the debug support means including:
a control register means for enabling and disabling a plurality of debugging operations; and
an index register means for passing second data to and from the processor.

16. An embedded processing system according to claim 15, wherein the control register means comprises:
a first means for enabling a debug mode and for disabling the debug mode;
a second means for indicating a status of a pipeline flushing operation;
a third means for enabling a trap handling operation and for disabling the trap handling operation; and
a fourth means for controlling the trap handling operation.

17. An embedded processing system according to claim 15, wherein the index register means comprises:
a write enable means for directing read operations and write operations;
an address means for storing an address to be accessed; and
a data storage means to store data being transferred.

18. An embedded processing system according to claim 15, comprising:
a memory means, the memory means storing the target program.

19. An embedded processing system according to claim 15, comprising:
software to direct operations of the debug support unit means.

* * * * *